April 28, 1925.

W. R. McGOWEN

FENDER GUARD

Filed Feb. 9, 1924

1,535,170

INVENTOR
William R. McGowen,
By Kay, Totten & Brown,
Attorneys.

Patented Apr. 28, 1925.

1,535,170

UNITED STATES PATENT OFFICE.

WILLIAM R. McGOWEN, OF CHICAGO, ILLINOIS, ASSIGNOR TO UNITED STATES CHAIN & FORGING COMPANY, OF PITTSBURGH, PENNSYLVANIA, A CORPORATION OF DELAWARE.

FENDER GUARD.

Application filed February 9, 1924. Serial No. 691,666.

*To all whom it may concern:*

Be it known that I, WILLIAM R. McGOWEN, a citizen of the United States, and resident of Chicago, in the county of Cook and State of Illinois, have invented a new and useful Improvement in Fender Guards; and I do hereby declare the following to be a full, clear, and exact description thereof.

My invention relates to fender guards for vehicles, and particularly to the provision of means for preventing the fenders from injury through engagement with extraneous objects such as other vehicles.

One of the objects of my invention is to provide a guard of the type described wherein provision is made for effectively resisting both sidewise and endwise thrusts, and one wherein the impact-receiving portions of the device are securely and rigidly supported, and to provide an improved means of attachment to the vehicle.

Still another object of my invention is to simplify and improve generally guard devices of this character.

Figure 1:
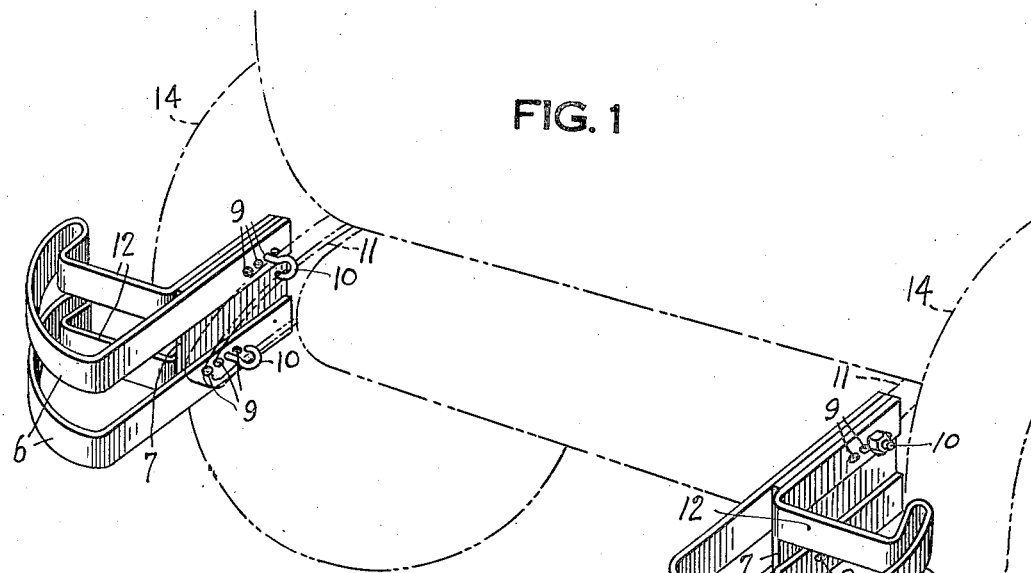
Figure 2:
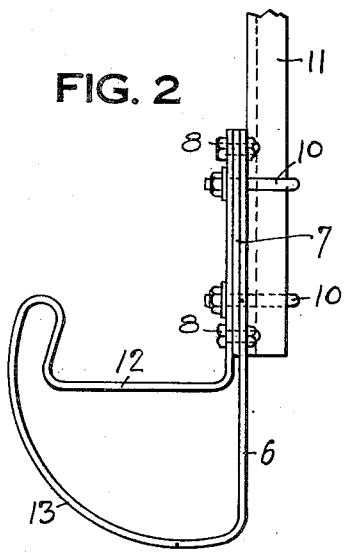
Figure 3:
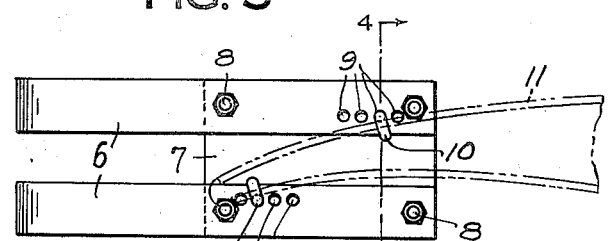
Figure 4:
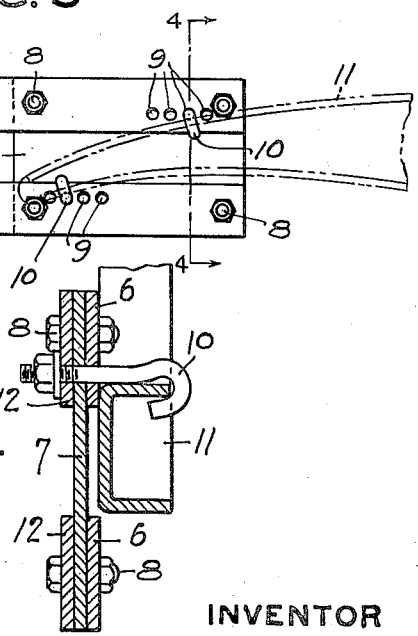
Figure 5:
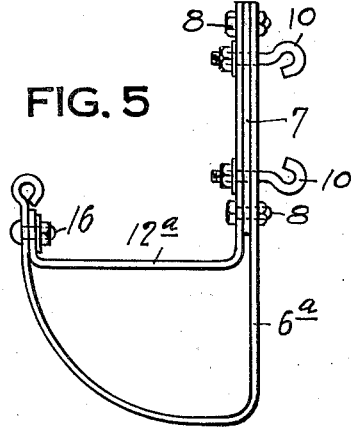

Some of the forms which my invention may take are shown in the accompanying drawing, wherein Fig. 1 is a perspective view showing a pair of my improved fender guards mounted in position to protect the rear fenders of an automobile; Fig. 2 is a plan view of one of the guards of Fig. 1; Fig. 3 is a view thereof in side elevation; Fig. 4 is a vertical sectional view taken on the line 4—4 of Fig. 3; and Fig. 5 is a plan view of a modified form of guard.

As shown in Fig. 1, each of the fender guards comprises two strap members 6, preferably of spring steel, each bent to the form shown more clearly in Fig. 2. A plate 7 is disposed between the opposite ends of the respective strap members 6 and is rigidly secured thereto by means of bolts 8. A series of perforations 9 extend through the members 6 and 7 for the reception of hook bolts 10 that may be shifted from one hole to another, in order to adjust them to automobile frames of various contours, the frame in the present case being indicated by the numeral 11.

It will be seen that each of the straps 6 is provided with a transversely extending portion 12 that serves to assist the curved portion 13 of the strap in yieldingly resisting thrusts imparted in a direction longitudinal of the vehicle, and also serves as a strut member to brace the curved portion 13 against sidewise thrusts. Also, the forward curved extremities of the straps 6 are bent in slightly to a point within the longitudinal vertical plane of the outer edge of the fenders 14, thus avoiding danger of becoming hooked over objects disposed adjacent to the path of movement of the car, while the guard surfaces to the rear thereof extend beyond the outer edge of the fenders.

The base plate 7 and the bolts 8 provide a tying and supporting device of great strength for the straps 6, and one lending itself to convenient attachment to car frames of various sizes and shapes. As the straight parallel portions of the straps 6 are rigidly supported, there is no tendency to their becoming loose, as would be the case if they were attached to the frame solely by the hook bolts 10 and without the interposition of the plate 7.

Referring now to Fig. 5, I provide a base plate 7 and hook bolts 10 of a construction similar to the corresponding parts in Figs. 1 to 4, but for the strap members 6 I substitute strap members 6ª and 12ª of spring steel. These strap members are secured to the base plate 7 in substantially the same manner as are the strap members 6 of the other figures, but the strap member 12ª is not integral with the strap member 6ª, being attached thereto at its outer end by a bolt 16. The strap member 12ª functions in substantially the same manner as the crosspiece 12 of the other figures to brace and assist the strap member 6ª in resisting impacts.

From the foregoing, it will be seen that I provide a simple and effective form of guard which may be readily applied to different types of automobiles, and one which will not interfere with access to the spare tire carrier with which machines are commonly equipped, such carrier not being shown, however, in the drawing.

Various changes in details and general arrangement may be made without departing from the spirit and scope of my invention as defined in the accompanying claims.

What I claim is:

1. An impact member for vehicles comprising a one-piece, recurved strap of yielding material, its outer looped end being inturned and disposed substantially parallel to the longitudinal center line of the vehicle, and its inner end portions being adapted to be secured to the frame of the vehicle.

2. An impact member comprising a one-piece strap member bent upon itself at substantially the middle portion thereof to form an outer inturned curved end, and its extremities brought into juxtaposition to enable them to be secured to the frame-work of a vehicle.

3. A vehicle fender guard comprising a pair of vertically spaced strap members, whose outer portions are curved toward the fender to be guarded, and a base plate secured to the inner ends of said members to form a unitary structure therewith, the outer extremities of the members and the base plate being disposed substantially parallel to the longitudinal center line of the vehicle.

4. An impact structure for vehicles comprising a recurved strap like member of yielding material whose outer looped end is inturned and disposed substantially parallel to the longitudinal center line of the vehicle and whose inner end portions are adapted to be secured to the frame of the vehicle, the said looped end being connected to one of said inner ends by a radially disposed portion serving as a strut.

5. An impact member comprising a strap of yielding material having a straight portion adapted to be secured to a vehicle frame, an arcuate portion adapted to extend across the face of a fender, and a strut portion extending radially inward from the outer end of said arcuate portion and connected to the vehicle frame, the other end of said arcuate portion being connected to said straight portion.

In testimony whereof I, the said WILLIAM R. McGOWEN, have hereunto set my hand.

WILLIAM R. McGOWEN.